United States Patent Office 3,574,089
Patented Apr. 6, 1971

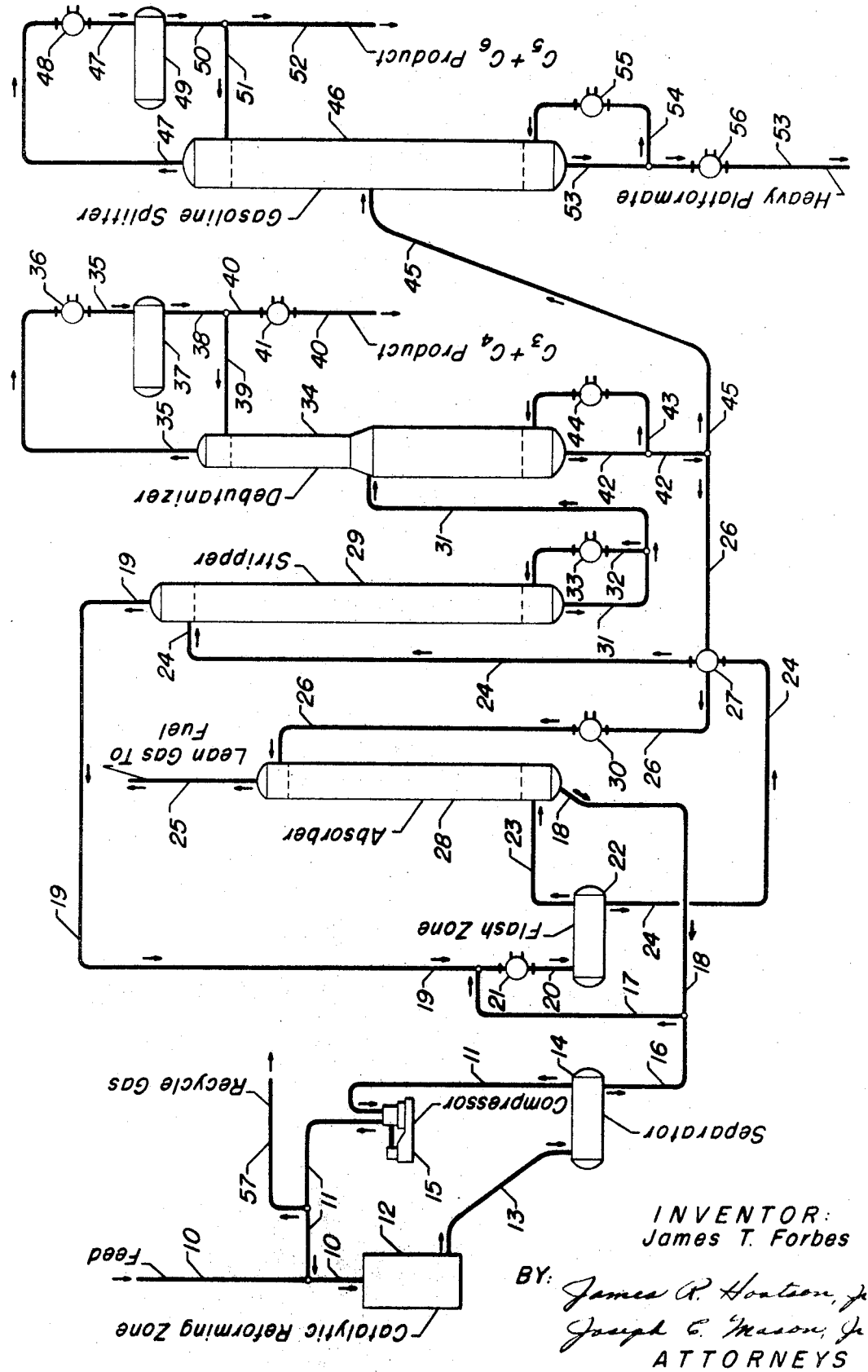

3,574,089
GAS SEPARATION FROM HYDROGEN CONTAINING HYDROCARBON EFFLUENT
James T. Forbes, Arlington Heights, Ill., assignor to Universal Oil Products Company, Des Plaines, Ill.
Filed Jan. 27, 1969, Ser. No. 794,088
Int. Cl. C10g 5/04
U.S. Cl. 208—101                                    2 Claims

ABSTRACT OF THE DISCLOSURE

Method for separating the effluent from a catalytic reforming zone utilizing absorption and fractionation techniques. The inventive processing scheme permits high recovery of normally gaseous hydrocarbons as well as reformate.

BACKGROUND OF THE INVENTION

This invention relates to a method for the conversion of hydrocarbons. It particularly relates to the catalytic reforming of hydrocarbons to produce gasoline boiling range products. It specifically relates to a method for separating the effluent from a catalytic reforming zone via an improved absorption and fractionation technique.

It is well known in the art that high quality gasoline boiling range products, such as aromatic hydrocarbons, e.g. benzene, toluene, and xylene, may be produced by a catalytic reforming process wherein naphtha-containing feedstocks are passed over platinum-containing catalyst in the presence of hydrogen in order to convert at least a portion of the feedstock into aromatic hydrocarbons. One of the predominant reactions in catalytic reforming involves dehydrogenation of naphthenic hydrocarbons. The dehydrogenation function produces a net excess of hydrogen from the process which is available for other uses, such as hydrodesulfurization reactions, and the like. A considerable portion of the produced hydrogen, however, is required for recycle purposes in order that a proper partial pressure of hydrogen may be maintained over the catalyst in the catalytic reforming zone. It follows, therefore, that it is necessary to separate the hydrogen gas from the effluent of a catalytic reforming zone before it can be utilized for such purposes. Normally, this is performed according to prior art schemes by flash separation in a flash zone subsequent to the catalytic reforming zone.

In addition, the catalytic reforming reaction also involves a hydrocracking function which segments hydrocarbons into relatively low molecular weight hydrocarbons, e.g. normally gaseous hydrocarbons, such as methane, ethane, propane, butane, etc. and, in particular, $C_{2+}$ hydrocarbons which then become contaminants in the gaseous hydrogen which is separated from the effluent of the reaction zone. However, these normally gaseous hydrocarbons have utility and as such it is desirable to recover them in as high concentration as possible. In particular, the $C_3$ and $C_4$ hydrocarbons are useful as feedstock for the alkylation reaction, or for some reactions such as cracking the $C_3$ olefins are useful as a feedstock for polymerization to gasoline boiling range materials or solid polymers, commonly known as polypropylene. All of these normally gaseous hydrocarbons are, therefore, generally separated from the effluent of a conversion zone by various techniques usually including absorption and fractionation and which produce as a residual material of reformate or high quality gasoline boiling range materials.

Other hydrocarbon conversion processes produce normally gaseous hydrocarbons in varying amounts. For example, hydrocracking reactions, catalytic cracking reactions, thermal cracking reactions, and the like, produce commercially desirable quantities of these normally gaseous hydrocarbons. Therefore, it would be desirable to provide a method for separating the effluent from these conversion zones into particular products, such as those individual products from normally gaseous hydrocarbons and a gasoline boiling range product comprising normally liquid hydrocarbons.

SUMMARY OF THE INVENTION

Therefore, it is an object of this invention to provide an improved method for the conversion of hydrocarbons and the recovery of high quality products therefrom.

It is another object of this invention to provide an improved method for the catalytic reforming of hydrocarbons to produce normally gaseous hydrocarbon products and gasoline boiling range products in a facile and economical manner.

It is a particular object of this invention to provide an improved method for separating the effluent from a hydrocarbon conversion zone into normally gaseous hydrocarbon products and normally liquid hydrocarbon products.

Accordingly, the present invention provides a method for separating the effluent from a hydrocarbon conversion zone which comprises: (a) introducing the hydrocarbon effluent from said conversion zone into a relatively low pressure separation zone maintained under separation conditions sufficient to produce a gaseous stream containing normally gaseous hydrocarbons and a liquid stream comprising normally liquid hydrocarbons; (b) passing said gaseous stream into an absorption zone in contact with a hereinafter specified lean absorber oil, said absorption zone maintained under conditions sufficient to produce a lean gas product stream comprising $C_1$ and $C_2$ hydrocarbons and a rich absorber oil containing absorbed normally gaseous hydrocarbons; (c) introducing said rich absorber oil into said low pressure separation zone of Step (a); (d) passing the liquid stream of Step (a) into a fractionation zone under conditions sufficient to produce a second product stream comprising $C_3$ and $C_4$ hydrocarbons and a liquid fraction containing normally liquid hydrocarbons; and, (e) introducing a portion of said liquid fraction of Step (d) into said absorption zone as the specified lean absorber oil.

Thus, in essence, it can be seen that the present invention introduces, in one embodiment, the hydrocarbon portion of the effluent from the conversion zone into a low pressure flash zone. The flashed vapors are then introduced into an absorption zone and the residual liquid is introduced into a fractionation zone. Through the interrelated and interdependent relationship of the absorption step and the fractionation step a high recovery of normally gaseous hydrocarbon products is obtained as well as the desirable normally liquid hydrocarbon product.

DETAILED DESCRIPTION OF THE INVENTION

The art of catalytic reforming and the broad art of hydrocarbon conversion described hereinabove is generally well known to those skilled in the art and need not be discussed in great detail herein. However, for illustrative purposes, the present invention will be described with reference to the catalytic reforming process, although it is to be understood that the present invention broadly provides a method for separating the effluent from any conversion reaction zone which contains the types of components which are broadly referred to herein as "normally gaseous hydrocarbons" and "normally liquid hydrocarbons."

Therefore, in brief, suitable charge stocks for use in the catalytic reforming operation to produce gasoline boiling range products, such as the previously mentioned aromatic hydrocarbons, are those which contain both naphthenes and paraffins in relatively high concentration. Such feedstocks include narrow boiling fractions, such as naphtha fractions, as well as substantially pure materials, such as cyclohexane, methylcyclohexane, mixtures thereof, and the like. The preferred class of suitable feedstocks for the catalytic reforming operation include primarily straight-run gasolines, such as the light and heavy naphtha fractions. It is distinctly preferred to use a naphtha fraction boiling between, say, 90° F. and 450° F. as the feedstock to the catalytic reforming operation.

The preferred types of catalyst for use in the catalytic reforming process are well known to those skilled in the art and typically comprises platinum and an alumina support. These catalysts may contain substantial amounts of platinum, but for economic and quality reasons, the platinum will be typically within the range from 0.5% to 5.0% by weight.

Satisfactory operating conditions for the catalytic reforming operation include the presence of the hereinabove mentioned catalyst and temperatures from about 500° F. to 1050° F., preferably from about 600° F. to 1000° F., pressures from about 50 p.s.i.g. to about 1200 ps.i.g., preferably from about 100 p.s.i.g. to 300 p.s.i.g, a liquid hourly space velocity from within the range from about 0.2 to 40, and the presence of a hydrogen-containing gas equivalent to a hydrogen-to-hydrocarbon mol ratio of about 0.5 to 15.0.

In many operations involving the conversion of hydrocarbons there is a solid particulate catalyst utilized. Conventionally, the catalytic mass may be contained in a fixed bed or series of fixed beds, may be moved as in a moving bed operation, or may be fluidized by techniques well known to those skilled in the art. Similarly, the catalytic reforming operation is carried out in a fixed bed configuration. Usually, a plurality of catalyst beds are also used either in stacked fashion within a single reactor shell or more preferably in separate reactors. A single reactor with a single catalyst bed may be utilized, but preferably for catalytic reforming, a plurality of catalyst beds are used. Still more preferably, in the conversion practice of this invention, from 2 to 5 catalyst beds maintained in separate reactor vessels are utilized. As, for example, 4 separate reactor beds are used to illustrate the preferred embodiment of this invention.

The amount of catalyst used in each reactor bed may be varied considerably depending upon the characteristics of the feedstock and the purpose for which the conversion reaction is carried out. In catalytic reforming, for example, the catalyst may be disposed in separate reactors in the following manner: 10%, 15%, 25%, and 50%, by weight respectively. Other variations of reactor geometry and catalyst volume will be evident to those skilled in the art from general knowledge and the specific teachings presented herein.

The unique features of this invention may be best understood by a comparison with well known prior art schemes. For the catalytic reforming conversion reaction, the prior art scheme will operate the catalytic reforming reactors at a pressure from 300 to 450 p.s.i.g. The separator following the reaction zone is at substantially the same pressure allowing for pressure drop through the system. The prior art sequence separates the hydrogen-containing gas from the hydrocarbon phase in this separator and generally a portion of the separated hydrogen is returned to the reaction zone. The hydrocarbon portion is then passed into a series of fractionation columns in order to separate the hydrocarbon components into various desired fractions.

With reference to the description of this invention, it can be seen that the present invention has at least the added features of passing the hydrocarbon portion of the effluent from the high pressure separator into a low pressure flash zone. As used herein, the term "low pressure flash zone" is intended to embody the concept of obtaining the hydrocarbon portion of a conversion zone effluent at a high pressure and then reducing the pressure of the effluent stream to some suitable level. The low pressure flash zone should operate at a pressure of at least 25, and more preferably from 50 to 100 p.s.i.g. lower than the pressure from which the hydrocarbon effluent portion is obtained. In other words, it is a requirement of this invention that the first step in the processing sequence be a reduction in pressure for the flashing of a suitable feed material under conditions sufficient to produce a gaseous stream containing normally gaseous hydrocarbons and normally liquid stream containing normally liquid hydrocarbons.

Another feature of this invention involves the passage of the flashed gaseous stream containing normally gaseous hydrocarbons directly into an absorption zone in contact with a hereinafter specified lean absorber oil. The remaining liquid stream from the low pressure flash operation is introduced into a stripping zone which is maintained under conditions to strip therefrom residual normally gaseous hydrocarbons. The stripped normally gaseous hydrocarbons are obtained as an overhead fraction and returned to the low pressure flash zone in admixture with the feed material to the low pressure flash zone. The residual liquid phase containing normally liquid hydrocarbons and the desired normally gaseous hydrocarbons are now introduced into a fractionation zone from which the various desirable hydrocarbon components may be obtained by distillation. For example, the embodiments of this invention produce a normally gaseous hydrocarbon product comprising $C_3$ and $C_4$ hydrocarbons in high concentration. The bottoms material from the debutanizing operation is passed in part as the lean absorber oil into the absorption zone. The remaining part of the debutanizer bottoms material is obtained as a desired product stream. Finally, the rich absorber oil from the absorption zone which contains absorbed normally aqueous hydrocarbons is also passed into the low pressure flash zone in admixture with the feed hydrocarbons and, preferably, in admixture with the overhead fraction from the stripper column.

Operating according to the practices of this invention permits unusually high recovery of $C_3$ and $C_4$ hydrocarbons as well as the desired normally liquid hydrocarbons, such as reformate produced in a catalytic reforming zone.

The invention may be more fully understood with reference to the appended drawing which is a schematic representation of apparatus for practicing one embodiment of the present invention.

DESCRIPTION OF THE DRAWING

A petroleum-derived naphtha fraction is introduced into the system via line 10, admixed with recycle hydrogen from line 11, and introduced into catalytic reforming zone 12 which contains a platinum catalyst and is operated under conventional reforming conditions. To illustrate the mechanics of this invention, the operating pressure of catalytic reforming zone 12 is chosen to be about 200 p.s.i.g. at the inlet to the catalytic reactors. The total effluent from the catalytic reforming zone is withdrawn via line 13, cooled by means of condensers, not shown, and passed into the high pressure separation zone 14 at a pressure of about 150 p.s.i.g.

The pressure in separation zone 14 is deemed to be at relatively high pressure and substantially that maintained in reaction zone 12, although it is recognized that it will be lower than the reaction pressure due to the pressure drop through the system. However, by definition, the pressure maintained in high pressure separator 14 is deemed to be relatively high pressure regardless of its actual pressure level. Sufficient separation means including residence time is imposed on zone 14 so that a relatively pure hydrogen stream is separated via line 11, compressed by compressor 15, and returned to catalytic reforming zone 12 in the manner previously mentioned. A net amount of hydrogen for use in other processes may be removed from the system via line 57.

A predominantly liquid stream containing a mixture of normally liquid and normally gaseous hydrocarbons is separated in separator 14 and withdrawn via line 16. The material in line 16 is admixed with rich absorber oil from a source hereinafter discussed from line 18, and the admixture passed via line 17 into further admixture with a hereinafter specified distillate stream from line 19. Thus, the material in line 16, 18, and 19 comprise the feedstock to be separated according to the practices of this invention. The combined feed material is introduced via line 20 into cooler 21 and into low pressure flash drum 22 at a pressure at least 25 p.s.i.g. lower than the pressure maintained in high pressure separator 14. These conditions in low pressure flash zone 22 are sufficient to produce a gaseous stream comprising normally gaseous hydrocarbons, e.g. residual hydrogen, $C_1$, $C_2$, $C_3$, and a small amount of $C_4$ and $C_5$ hydrocarbons which is withdrawn via line 23 and passed into absorption zone 28.

From a source hereinafter specified, lean absorber oil is introduced into absorption zone 28 from line 26. Thus, the vapors from line 23 pass upwardly in intimate contact with the downwardly flowing lean absorber oil. Therefore, a lean gas suitable for use as fuel and containing the residual hydrogen, $C_1$, and $C_2$ hydrocarbons is withdrawn from the system via line 25. The rich absorber oil containing the dissolved or absorbed normally gaseous hydrocarbons is withdrawn from absorber 28 via line 18 and passed into admixture with the material in line 16 as previously mentioned.

Satisfactory operating conditions for absorber 28 include an average temperature of about 90° F. to 150° F., typically about 120° F., and a pressure substantially the same as that maintained in low pressure flash zone 22, e.g. a pressure of about 125 p.s.i.g.

Returning now to low pressure flash zone 22, the residual liquid which contains $C_6+$ hydrocarbons together with normally liquid hydrocarbons, such as $C_3$, $C_4$, and $C_5$ hydrocarbons is withdrawn from flash zone 22 via line 24, passed into indirect heat exchange for the heating thereof in exchanger 27, and introduced into the upper section of stripper column 29. Suitable conditions are maintained in stripper column 29 in order to produce a distillate fraction containing normally gaseous hydrocarbons and minor amounts of normally liquid hydrocarbons which is withdrawn via line 19 and introduced into flash zone 22 in the manner previously discussed. The remaining bottoms material comprising normally liquid hydrocarbons and the desired normally gaseous hydrocarbons, such as $C_3$ and $C_4$ hydrocarbons, is withdrawn via line 31 and passed into debutanizing column 34. To provide sufficient heat and vapors for stripping, a recycle stream of the material in line 31 is generated by passage of a portion of the material from line 31 via line 32 through reboiler 33 back into column 29.

For illustrative purposes, stripper column 29 may be operated with an overhead temperature of about 167° F. and a bottoms temperature of about 290° F. Stripper column 29 may also be maintained under an operating pressure of about 155 p.s.i.g. at the top of the column. This increase in pressure between absorber column 28 and stripper column 29 is obtained by pumping the material in line 24 by means of a pump, not shown.

Suitable operating conditions are maintained in debutanizer column 34 in order to produce a vaporous fraction containing primarily $C_3$ and $C_4$ hydrocarbons which is withdrawn from column 34 via line 35. This overhead gaseous material is condensed in condenser 36 and accumulated in receiver 37. The liquefied material is withdrawn from receiver 37 via line 38 and a sufficient amount for reflux purposes is reintroduced into the top of column 34 via line 39. The remaining material is withdrawn via line 40, further cooled in cooler 41, and passed to storage as a predetermined desired $C_3$ and $C_4$ hydrocarbon product material.

The bottoms product from debutanizer 34 containing the desired normally liquid hydrocarbons is withdrawn via line 42 and a portion thereof returned to the column via line 43 and reboiler 44 for the purpose of supplying the heat for fractionation. The remaining material in line 42 is now separated into two fractions. One fraction is passed via line 26 through heat exchanger 27, cooler 30, into the top of absorber column 28 as the lean absorber oil, previously mentioned hereinabove. The remaining fraction is passed via line 45, in a preferred embodiment of this invention, into gasoline splitter column 46. Gasoline splitter column 46 is maintained under sufficient distillation conditions to produce an overhead gaseous product stream comprising $C_5$ and $C_6$ hydrocarbons which is withdrawn via line 47, condensed in condenser 48, and accumulated in receiver 49. The liquefied material is withdrawn from receiver 49 via line 50 a portion thereof sufficient for reflux purposes is reintroduced into the top of column 46 via line 51. The net remaining liquid stream is withdrawn from the system via line 52 and comprises another desired $C_5$ and $C_6$ hydrocarbon product stream.

The bottoms material from gasoline separator column 46 comprises the desired normally liquid hydrocarbons, e.g. reformate, and is withdrawn from column 46 via line 53. A portion of the material in line 53 is passed via line 54 and reboiler 55 back into column 46 for the purpose of supplying the heat for fractionation. A net product stream comprising the desired reformate is cooled in cooler 56 and withdrawn from the system via line 53.

For illustrative purposes, debutanizer column 34 is maintained under an operating temperature of about 190° F. in the top of the column and 460° F. in the bottom of the column. Column 34 is also maintained under an operating pressure of about 280 p.s.i.g. at the top of the column.

Illustrative operating conditions for gasoline splitter column 46, includes a top temperature of about 137° F. and a bottom temperature of about 275° F. The column is operated at substantially atmospheric pressure with the top of the column being maintained at about 4 p.s.i.g. and the bottom of the column being maintained at about 8 p.s.i.g.

The following example is furnished to demonstrate some of the benefits to be achieved by the practice of the present invention

EXAMPLE

A commercial scale catalytic reforming plant was designed to process a naphtha feedstock. The following data illustrates the composition of the various stream which may be separated in accordance with the present invention. Except as otherwise specified, all numbers shown in the table are in mols per hour, and reference should be made to the appended drawing for applicable line numbers and to the hereinabove referred to operating conditions which are applicable to the operation of the commercial scale unit.

| Line No | 16 | 19 | 18 | 20 | 23 | 24 | 26 | 25 | 31 | 40 | 42 | 45 |
|---|---|---|---|---|---|---|---|---|---|---|---|---|
| Component: | | | | | | | | | | | | |
| $H_2$ | 16.39 | 1.20 | 0.16 | 17.75 | 16.55 | 1.20 | | 16.39 | | | | |
| $C_1$ | 29.13 | 17.44 | 2.12 | 48.69 | 31.24 | 17.45 | | 29.13 | | | | |
| $C_2$ | 87.46 | 310.77 | 37.89 | 436.12 | 120.93 | 315.19 | | 83.03 | 4.43 | 4.43 | | |
| $C_3$ | 146.11 | 156.02 | 29.73 | 331.86 | 37.03 | 294.84 | | 7.29 | 138.82 | 138.82 | | |
| $iC_4$ | 62.19 | 27.34 | 5.52 | 95.05 | 5.19 | 89.86 | 0.82 | 0.49 | 62.52 | 59.05 | 3.47 | 2.65 |
| $nC_4$ | 98.00 | 32.49 | 6.77 | 137.26 | 5.60 | 131.66 | 1.92 | 0.75 | 99.17 | 91.20 | 7.97 | 6.05 |
| $iC_5$ | 82.99 | 15.49 | 20.38 | 118.86 | 2.24 | 116.62 | 22.00 | 3.86 | 101.13 | 2.01 | 99.12 | 77.12 |
| $nC_5$ | 56.13 | 8.67 | 14.18 | 78.98 | 1.16 | 77.82 | 15.12 | 2.10 | 69.15 | 0.69 | 68.46 | 53.34 |
| $C_{6+}$ | 865.10 | 18.52 | 233.34 | 1,116.96 | 1.62 | 1,115.29 | 235.10 | 3.43 | 1,096.77 | | 1,096.77 | 861.67 |
| Total | 1,143.50 | 587.94 | 350.11 | 2,381.55 | 221.61 | 2,159.53 | 274.97 | 146.48 | 1,571.99 | 296.20 | 1,275.79 | 1,000.83 |
| Lb./hr | 117,520 | 23,360 | 29,620 | 170,500 | 6,820 | 163,680 | 26,920 | 4,120 | 140,320 | 15,420 | 124,900 | 9,980 |
| M.W. | 81.4 | 39.7 | 84.6 | 71.59 | 30.8 | 75.8 | 97.9 | 28.1 | 89.3 | 52.1 | 97.9 | 97.9 |
| B.p.s.d | 11,104 | | 2,747 | | | 16,076 | 2,338 | | 12,764 | 1,919 | 10,845 | 8,507 |
| Lb./gal | 6.04 | | 6.15 | | | 5.81 | 6.57 | | 6.27 | 4.60 | 6.57 | 6.57 |
| $10^6$ scfd | | 5.35 | | | 2.02 | | | 1.33 | | | | |

It is to be noted from the composition of the material in line 25 that substantially all of the $C_3$ and $C_4$ hydrocarbons have been recovered as a desired product stream. This unusually high recovery of LPG components is obtained by the interrelated and interdependent relationship of the absorber column, the stripper column, and the debutanizer column, which operate in cooperation to maximize the recovery of these normally gaseous hydrocarbon components.

PREFERRED EMBODIMENT

Therefore, from the detailed description presented hereinabove, the preferred embodiment of this invention provides an improved method for separating the hydrocarbon effluent from a catalytic reforming zone which comprises:
(a) introducing said effluent into a low pressure flash zone maintained under conditions sufficient to produce a gaseous stream containing $C_1$ to $C_4$ hydrocarbons, and a liquid stream containing normally liquid hydrocarbons and normally gaseous hydrocarbons; (b) passing said gaseous stream into an absorption zone in contact with a hereinafter specified lean absorber oil, said absorption zone maintained under conditions sufficient to produce a lean gas product stream comprising $C_1$ and $C_2$ hydrocarbons, and a rich absorber oil containing absorbed $C_3$ and $C_4$ hydrocarbons; (c) introducing said rich absorber oil into said low pressure flash zone of Step (a); (d) passing said liquid stream of Step (a) into a stripping zone maintained under conditions sufficient to produce a gaseous fraction comprising normally gaseous hydrocarbons, and a bottoms fraction comprising normally liquid hydrocarbons; (e) returning said gaseous fraction of Step (d) to said low pressure flash zone of Step (a); (f) introducing said bottoms fraction into a fractionation zone under conditions sufficient to produce a second product stream comprising $C_3$ and $C_4$ hydrocarbons, and a liquid fraction comprising $C_{5+}$ hydrocarbons; (g) introducing a portion of said liquid fraction of Step (f) into said absorption zone as the specified lean absorber oil; and (h) recovering the remainder of said liquid fraction of Step (f).

The invention claimed:
1. In the conversion of hydrocarbons in the presence of hydrogen in a conversion zone maintained under superatmospheric pressure, the method which comprises:
(a) introducing the effluent of said zone into a high pressure separating zone maintained under substantially the same pressure as the conversion zone and therein separating hydrogen from the effluent;
(b) discharging the remainder of said effluent from said high pressure separating zone into a flash zone maintained under a pressure at least 25 p.s.i.g. lower than the pressure in said separating zone and therein separating said remainder of the effluent into a gaseous stream containing normally gaseous hydrocarbons and a liquid stream comprising normally liquid hydrocarbons;
(c) contacting said gaseous stream in an absorption zone with a hereinafter specified lean absorber oil under conditions sufficient to produce a lean gas product stream comprising $C_1$ and $C_2$ hydrocarbons, and a rich absorber oil containing absorbed normally gaseous hydrocarbons;
(d) introducing said rich absorber oil into said flash zone of Step (b);
(e) fractionating said liquid stream of Step (b) under conditions sufficient to produce a second product stream comprising $C_3$ and $C_4$ hydrocarbons, and a liquid fraction containing normally liquid hydrocarbons; and
(f) introducing a portion of said liquid fraction of Step (e) into said absorption zone as the specified lean absorber oil.

2. In the conversion of hydrocarbons in the presence of hydrogen in a conversion zone maintained under superatmospheric pressure, the method which comprises:
(a) introducing the effluent of said zone into a high pressure separating zone maintained under substantially the same pressure as the conversion zone and therein separating hydrogen from the effluent;
(b) discharging the remainder of said effluent from said high pressure separating zone into a flash zone maintained under a pressure at least 25 p.s.i..g. lower than the pressure in said separating zone and therein separating said remainder of the effluent into a gaseous stream containing $C_1$ to $C_4$ hydrocarbons and a liquid stream containing normally liquid hydrocarbons and normally gaseous hydrocarbons;
(c) contacting said gaseous stream in an absorption zone with a hereinafter specified lean absorber oil under conditions sufficient to produce a lean gas product stream comprising $C_1$ and $C_2$ hydrocarbons, and a rich absorber oil containing absorber $C_3$ and $C_4$ hydrocarbons;
(d) introducing said rich absorber oil into said flash zone of Step (b);
(e) passing said liquid stream of Step (b) into a stripping zone maintained under conditions sufficient to produce a gaseous fraction comprising normally gaseous hydrocarbons, and a bottoms fraction comprising normally liquid hydrocarbons;
(f) returning said gaseous fraction of Step (e) to said flash zone of Step (b);
(g) introducing said bottoms fraction into a fractionation zone under conditions sufficient to produce a second product stream comprising $C_3$ and $C_4$ hydrocarbons, and a liquid fraction comprising $C_{5+}$ hydrocarbons;
(h) introducing a portion of said liquid fraction of Step (g) into said absorption zone as the specified lean absorber oil; and,
(i) recovering the remainder of said liquid fraction of Step (h).

References Cited
UNITED STATES PATENTS 2,745,889    5/1956    Johnston et al.    208—101
3,470,084    9/1969    Scott    208—101

HERBERT LEVINE, Primary Examiner

U.S. Cl. X.R.

208—341, 342